UNITED STATES PATENT OFFICE.

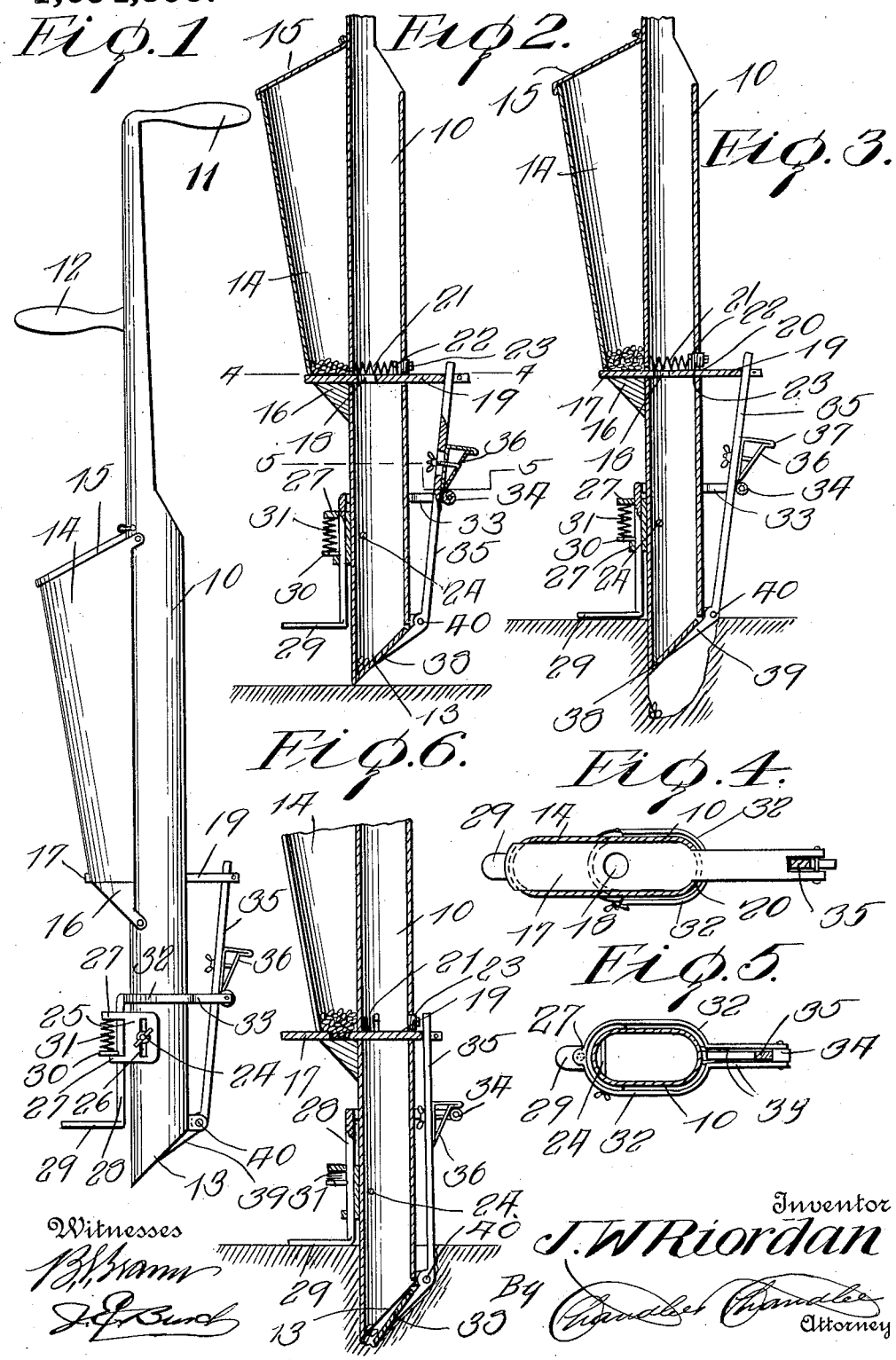
J. W. RIORDAN.
HAND PLANTER.
APPLICATION FILED FEB. 27, 1913.
1,094,595. Patented Apr. 28, 1914.

JOHN W. RIORDAN, OF BEAVER CROSSING, NEBRASKA.

HAND-PLANTER.

1,094,595.  Specification of Letters Patent.  Patented Apr. 28, 1914.

Application filed February 27, 1913. Serial No. 751,100.

*To all whom it may concern:*

Be it known that I, JOHN W. RIORDAN, a citizen of the United States, residing at Beaver Crossing, in the county of Seward, State of Nebraska, have invented certain new and useful Improvements in Hand-Planters; and I do hereby declare the following to be a full, clear, and exact description of the invention, such as will enable others skilled in the art to which it appertains to make and use the same.

This invention relates to new and useful improvements in hand planters, designed for the planting of corn, beans, peas and the like.

The invention resides in a novel device of this character designed to overcome the objections to planters operating by forcing the device in the ground to form the hills and then pulling on the handle to release the seed, by providing an improved mechanism whereby when the device is forced into the ground, the seed will be discharged into the slide valve while when the planter is pulled out of the ground, the seed will fall into the shoe and be discharged into the pocket cut therefor.

With the above and other objects in view, the invention resides more particularly in the peculiar combinations and arrangements of parts as will be partly illustrated as a preferred embodiment in the accompanying drawings and described in the specification, although the invention is protected for all desirable changes and uses within the scope of the invention as claimed.

Figure 1 is a side elevation of a hand planter constructed in accordance with the invention and in its normal position. Fig. 2 is a central vertical sectional view thereof with certain of the parts in elevation. Fig. 3 is a view similar to Fig. 2 but showing the device in position when the planter is shoved into the ground. Fig. 4 is a cross sectional view taken on the line 4—4 of Fig. 1. Fig. 5 is a cross sectional view taken on the line 5—5 of Fig. 1. Fig. 6 is a vertical sectional view of the device in the position when discharging the seed, as the planter is being withdrawn from the ground.

In illustrating the preferred embodiment of the invention, the same is shown as embodying a shoe 10 in the form of a hollow section of metal or pipe preferably bent in oval form and having its upper end formed or provided with a handle 11 extending laterally and having an oppositely extending handle 12 secured to the shank portion of the shoe therebeneath. The lower end of the shoe is beveled or cut at an angle as shown at 13, rendering it sharp to easily penetrate the ground or soil.

A seed box or hopper 14 is secured to the shoe 10 intermediate of its ends, such box being of substantially wedge-shape in elevation and preferably formed of tin, the top of the box being provided with a hinged closure 15 for placing the seed therein and afterward protecting the seed. The box 14 tapers from its upper to its lower end, its lower end being open, while a triangular block 16 preferably of metal is soldered or otherwise secured to the adjacent portion of the shoe spaced beneath the lower end of the box to provide a slot accommodating a slide valve or plate 17. This plate is provided with an opening 18 in its end portion which operates through the slot thus formed and a reduced end 19 operating through a slot 20 in the opposite side of the shoe or chamber formed thereby, said valve or plate being held with the opening located within the chamber through the medium of a coiled expansion spring 21 which is attached to a vertically extended lug 22 carried by the valve plate, while the opposite end of the spring engages the inner wall of the shoe. By this means the valve plate is held in position to normally close the discharge end of the seed box and the opening in a dumped position, it being understood that the spring 21 and lug 22 may be positioned within the shoe by removing a screw plug 23 communicating with the slot 20.

A bolt 24 is engaged transversely through the shoe 10 near its lower end and is engaged by a support 25 which is provided with vertical slots 26 for adjusting the support vertically on the bolt. This support has a pair of vertically spaced apertured projections 27 receiving a sliding plunger 28 therethrough in contact with the peripheral face of the shoe, said plunger having its lower end flattened as shown and bent outwardly substantially at right angles to form a foot 29. The plunger also carries a lug 30 on which is engaged a coiled spring 31 at its lower end while the upper end of the spring engages one of the apertured projections 27 and thereby tends to normally force the plunger and its foot downwardly.

A loop 32 is attached to the upper end of the plunger and encircles the shoe, the extremities of the loop being bent in parallel relation as shown at 33 to receive a roller 34 which is horizontally journaled therein. A lever 35 is slidably connected to the reduced extremity of the valve plate 17 and extended between the portions 33 of the loop 32, while a wedge 36 is adjustably clamped to said lever with its pointed end downward and normally above the roller. This wedge is formed of a single strip of metal bent in the form specified and having a rebent portion 37 at its upper end providing a lug to limit the upward movement of the loop and consequently the plunger carried thereby.

A plate 38 is positioned to normally close the discharge end of the shoe or lower end of the chamber formed by the tubular section constituting the same, the lower toe of the plate normally lying above the toe of the shoe. This plate is riveted or otherwise secured to the flattened lowered portion of the lever 35 as shown at 39 while the adjacent portion of the lever is flattened immediately thereabove for the pivotal attachment of the lever to the heel of the shoe as shown at 40.

In the use of the device, the operator grasps the handles 11 and 12 and plunges the shoe into the earth as shown in Fig. 3 of the drawings, whereby the foot 29 will be forced upwardly against the action of the coiled spring 31 and thereby cause the roller 34 to travel up the inclined face of the wedge 36. This causes the lever 35 to be swung on its pivot, whereby the plate 38 will swing slightly downward and the valve plate 17 will be caused to slide forwardly through its respective guide slots. This action will take place against the tension of the coiled spring 21 and the opening 18 will be disposed in registry with the discharge end of the seed box for the dropping of the seed therein. Upon partially withdrawing the shoe, the foot will automatically move downwardly under the action of the spring 31, thus permitting the lever 35 to swing in an opposite direction and discharging the seed into the shoe. These seeds will be retained in the shoe until the device is again thrust in the ground, when they will be discharged and this operation is continued in a like manner.

I claim:—

In a hand planter, a shoe having a tapered discharge end, a seed box carried by the shoe, a valve plate slidable through the shoe and beneath the box, said plate having an opening therethrough, a lever connected to the plate, a plunger slidably carried by the shoe and operating in conjunction with the lever when the shoe is forced into the ground to shift the lever and the valve plate to move the opening to a receiving position, a plate carried by the lever inclosing the discharge end of the shoe, means operating in conjunction with the valve plate to normally hold the valve plate with its opening in a discharged position and means normally lowering the plunger.

In testimony whereof, I affix my signature, in the presence of two witnesses.

JOHN W. RIORDAN.

Witnesses:
  Mrs. HOWE FEES,
  Mrs. N. M. RIORDAN.

---

Copies of this patent may be obtained for five cents each, by addressing the "Commissioner of Patents, Washington, D. C."